(12) United States Patent
Jung

(10) Patent No.: US 7,859,963 B2
(45) Date of Patent: Dec. 28, 2010

(54) METHOD AND APPARATUS FOR ADJUSTING RECORDING POWER FOR OPTICAL DISK DEVICE

(75) Inventor: Man Young Jung, Osan-si (KR)

(73) Assignee: LG Electronics Inc., Seoul (KR)

( * ) Notice: Subject to any disclaimer, the term of this patent is extended or adjusted under 35 U.S.C. 154(b) by 691 days.

(21) Appl. No.: 11/698,912

(22) Filed: Jan. 29, 2007

(65) Prior Publication Data

US 2007/0223335 A1    Sep. 27, 2007

(30) Foreign Application Priority Data

Mar. 23, 2006 (KR) .................... 10-2006-0026332

(51) Int. Cl.
*G11B 7/00* (2006.01)
(52) U.S. Cl. .................. 369/47.53; 369/47.5
(58) Field of Classification Search .............. 369/47.53, 369/47.5
See application file for complete search history.

(56) References Cited

U.S. PATENT DOCUMENTS

| | | | |
|---|---|---|---|
| 2002/0024903 A1* | 2/2002 | Sato ..................... | 369/47.53 |
| 2002/0176338 A1* | 11/2002 | Ushiyama et al. ........ | 369/47.53 |
| 2003/0072235 A1* | 4/2003 | Naoi et al. ............... | 369/53.18 |
| 2003/0086346 A1* | 5/2003 | Fukumoto ............... | 369/47.53 |
| 2005/0083811 A1* | 4/2005 | Halloush et al. ......... | 369/47.51 |
| 2005/0265165 A1* | 12/2005 | Kitagaki et al. ........... | 369/47.5 |

FOREIGN PATENT DOCUMENTS

| | | |
|---|---|---|
| CN | 1591602 | 3/2005 |
| EP | 0556046 | 8/1993 |
| EP | 1351225 A2 | 10/2003 |
| EP | 1351225 A3 | 10/2003 |
| EP | 1598817 | 11/2005 |
| JP | 2002304729 | 10/2002 |
| JP | 2003132537 | 5/2003 |
| KR | 1020030073238 | 9/2003 |
| WO | WO2005/004121 A2 | 1/2005 |
| WO | WO2005/004121 A3 | 1/2005 |
| WO | WO2005/093732 | 10/2005 |

OTHER PUBLICATIONS

European Search Report dated Feb. 27, 2008.
English translation of Chinese Office Action dated Aug. 15, 2008.

* cited by examiner

*Primary Examiner*—Wayne R Young
*Assistant Examiner*—Latanya Bibbins
(74) *Attorney, Agent, or Firm*—Ked & Associates LLP

(57) ABSTRACT

A method and apparatus of controlling an optical disk apparatus determines a reference recording power at each of a plurality of recording speeds for an inserted optical disk, performs a power control procedure for a prescribed recording speed to determine a recording power at the prescribed recording speed in response to a recording request, and then computes a recording power at each of the recording speeds based on the reference recording power and the recording power determined at the prescribed recording speed. The power control procedure is performed only for an inner circumferential area of the disk, irrespective of whether a requested recording speed is less than or greater than the prescribed recording speed. As a result, the speed of the data recording operation may be substantially improved and/or other improvements may be realized.

27 Claims, 2 Drawing Sheets

METHOD AND APPARATUS FOR ADJUSTING RECORDING POWER FOR OPTICAL DISK DEVICE

BACKGROUND

1. Field

One or more embodiments described herein relate to an apparatus and method for controlling an optical disk device.

2. Background

Optical disk devices employ a variety of techniques to control the application of power during read and recording operations. During a recording operation, for example, an optimum power control (OPC) procedure is performed to determine the amount of power to apply based on several factors including recording speed and power calibration area (PCA)) on an inserted optical disk.

These factors may be independent values or one may be dependent on the other. In the latter case, recording speed may be used as a basis for defining the power calibration area for an OPC procedure. For example, in a background art application, if a requested recording speed is faster than a predetermined speed, the OPC procedure is performed for an inner circumferential area and an outer circumferential area of the disk. Performing the OPC procedure in both of these areas increases overall recording time and represents a substantial inconvenience to the user.

BRIEF DESCRIPTION OF THE DRAWINGS

The embodiments will be described in detail with reference to the following drawings in which like reference numerals refer to like elements wherein.

DETAILED DESCRIPTION

Optimum recording power for a specific recording speed depends on one or more factors including the type of pickup or optical disk device used, as well as changes in ambient environment and in particular changes in temperature. Irrespective of fluctuations in these features, the ratio of the change in recording power to the change in recording speed may be considered almost constant throughout low and high speeds for many applications.

In recognition of this constant relationship, one or more embodiments described herein compute high-speed recording powers to be used in a middle circumferential area and an outer circumferential area of a disk. In accordance with one embodiment, these computations are made based on reference power information for each of a plurality of recording speeds and recording power values determined through an OPC procedure performed for an inner circumferential area of a disk. By performing recording operations with these computed high-speed recording power values, recording power may be adjusted more accurately through the use of recording power compensating methods such as Running OPC (ROPC), temperature compensation, and beta value compensation to name a few.

Computing recording power in this manner may also reduce the length of time required to initiate a recording operation, especially when the OPC procedure is only performed in an inner circumferential area of a disk when a high-speed recording operation is requested.

Figure 1:
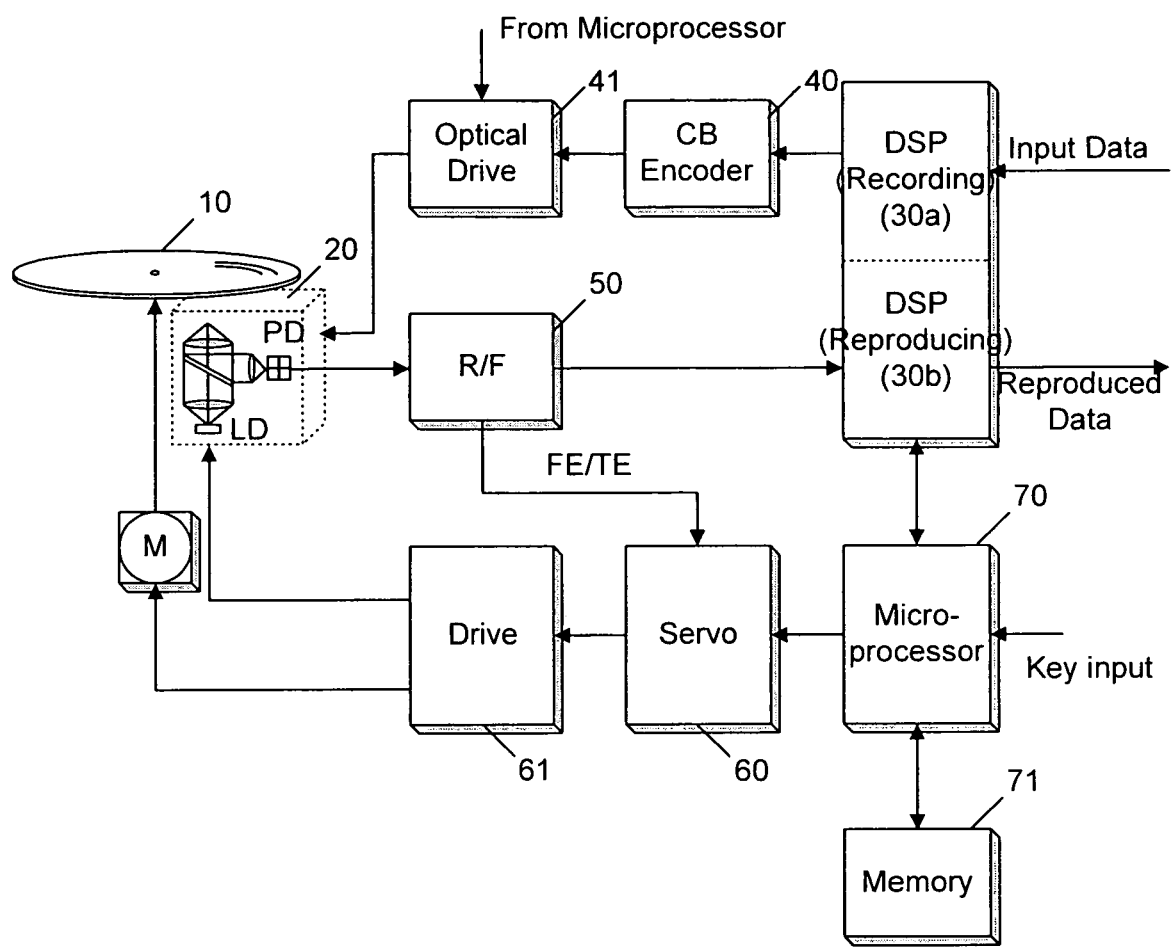
FIG. 1 is a diagram showing an optical disk device according to one embodiment.

FIG. 1 shows an optical disk device which includes a power control apparatus according to one embodiment. This device includes a digital signal processing (DSP) recording unit 30a, a channel bit (CB) encoder 40, an optical drive unit 41, an optical pickup 20, and an R/F unit 50. The DSP recording unit converts input digital data into a record format by adding an error correction code (ECC) to it. The channel bit encoder reconverts the data, which was converted into a record format, into a bit stream. The optical driving unit generates an optical drive input signal. The optical pickup records data onto a disk and detects data from a recording plane of a disk in accordance with the optical drive signals. And, the R/F unit normalizes the signal detected by the pickup and outputs it as binary signal.

The optical disk device may further include a digital signal processing (DSP) reproducing unit 30b, a drive unit 61, a serve unit 60, a microprocessor 70, and a memory 71. The DSP reproducing unit restores a binary signal received from the R/F unit into original data in accordance with a clock which is phase-synchronized to the binary signal. The drive unit drives a spindle motor M to rotate an optical disk 10 relative to motion of the pickup 20. The servo unit controls the drive of the drive unit based on a tracking error (TE) signal and a focus error (FE) signal of the pickup and a rotational speed of the optical disk.

The memory stores reference recording power values for each of a plurality of disk manufacturers (disk codes) for each of a plurality of recording speeds. The memory also stores a recording power ratio between the recording speeds. Memory 71 is preferably a nonvolatile memory (for example, EEPROM), although another type of memory may be used.

The microprocessor 70 detects a power ratio based on the reference recording power at each recording speed stored in the memory, and also detects a desired (e.g., optimum) recording power at each recording speed based on the detected power ratio and the detected optimum recording power. The latter power (i.e., the detected optimum recording power) may be determined through an OPC procedure performed for an inner circumferential area of the optical disk. A recording operation is then performed by applying the desired (e.g., optimum) recording power at each detected recording speed.

Figure 2:
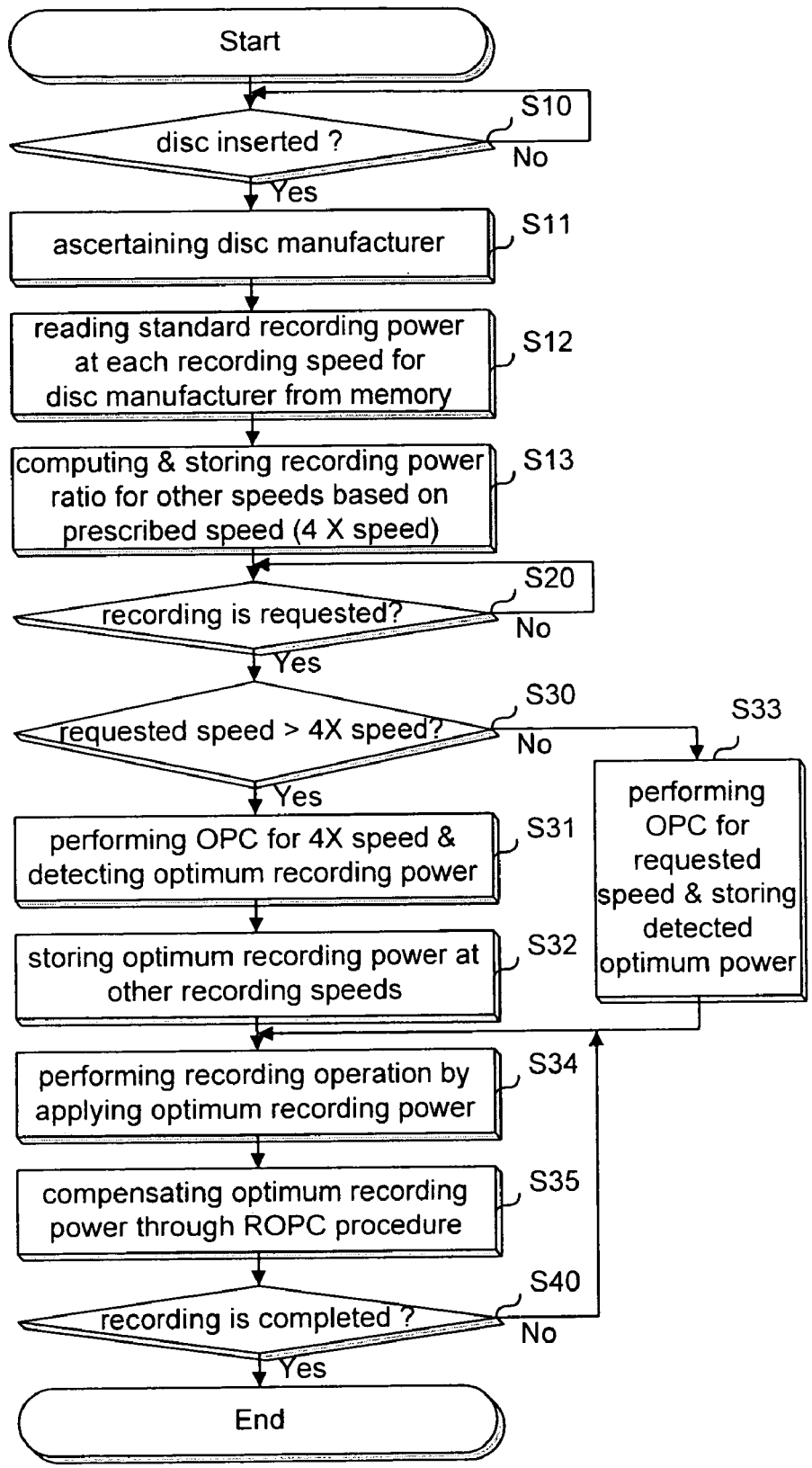
FIG. 2 is a flow diagram showing steps included in a recording method for an optical disk device according to one embodiment.

FIG. 2 is a flow diagram showing steps included in a recording method in accordance with one embodiment. For illustrative purposes, the method will be described with reference to the device shown in FIG. 1. However, those skilled in the art can appreciate that the method may be performed using a different disk device.

In describing the method, it is to be recalled that memory 71 preferably stores the reference recording power for each of a plurality of manufacturing companies relative to each of a plurality of recording speeds. The memory may also store one or more beta ($\beta$) values computed through simulation during the process of manufacturing the optical disk device. The beta values may be stored in the form of a table in association with corresponding disk manufacturers (disk codes).

Referring to FIG. 2, when a disk 10 is inserted into the optical disk device (S10), microprocessor 70 ascertains the disk manufacturing company of the disk through a disk code read from the inserted optical disk (S11). The microprocessor then reads from memory the reference recording power at each recording speed for the ascertained disk manufacturing company (S12), and computes recording power ratios for the speeds based on a predetermined (e.g., 4×) recording speed. These ratios are then stored in the memory (S13).

As an example of determining the power ratio, if the reference recording power stored in the memory for the disk code of the optical disk is 10 mW at 4× recording speed, 15 mW at 6× recording speed, 18 mw at 8× recording speed, and 20 mW at 10× recording speed, then the power ratio in other recording speeds is 1.5 at 6× recording speed, 1.8 at 8× recording speed, and 2 at 10× recording speed, on the basis of the recording power in 4× recording speed, i.e., 10 mW. These power ratios are preferably stored in table form in memory 71.

Hereafter, if the recording operation is requested from the user (S20), the microprocessor performs an OPC procedure on the optical disk. According to this procedure, if the recording speed requested is faster than a prescribed (e.g., 4×) recording speed (S30), the microprocessor performs the OPC procedure to detect a predetermined (e.g., optimum) recording power at the prescribed (e.g., 4×) recording speed. Information indicative of this power is then stored in memory (S31).

Even though the recording speed requested is faster than 4× recording speed, the OPC procedure is not performed for both in the inner circumferential area and the outer circumferential area of the disk. Instead, according to the present embodiment, the OPC procedure is performed only in the inner circumferential area of the disk in order to reduce the length of time of the OPC procedure. This is in contrast to the way in which background art methods apply an OPC procedure under these circumstances.

More specifically, according to background-art methods, an OPC procedure is performed for both the inner and outer circumferential areas of a disk. Performing the OPC procedure in both of these areas introduces a significant delay into the recording process which, for example, may be more than approximately 10 seconds. Moreover, OPC procedures may not perform accurately in the outer circumferential area. Consequently, background-art methods are susceptible to errors which may cause a failure in the OPC procedure and thus the overall recording process.

At least one embodiment may be implemented to overcome these problems. According to one embodiment, in performing an OPC procedure microprocessor 70 may read out the disk code of an inserted optical disk 10 (for example, DVD-R) and the reference recording power corresponding to a predetermined recording speed (for example, 4× recording speed) from the memory, and applies to the optical driving unit 41 an adjusting signal which changes the recording power by a prescribed magnitude (ΔP) based on the read-out recording power. The prescribed magnitude may be prestored in the optical disk device or in the storage area of the disk, another medium, or device.

As an example, if the read-out reference recording power is 10 mW and the amount of power change (ΔP) is 1 mW, microprocessor 70 applies to the optical driving unit 41 an adjusting signal which makes, for example, 7-step increments (+ΔP) of 1 mW and 7-step decrements (−ΔP) of 1 mW based on a read-out recording power (10 mW). In response, the optical driving unit 41 outputs a driving signal for test data as power corresponding to the applied adjusting signal, and the optical pickup 20 records the test data into a prescribed test region of the optical disk 10, e.g., a test region within a power calibration area (PCA).

Once recordation of the test data is completed, the microprocessor 70 consecutively reads out the test data which is recorded and detects the beta (β) value from the reproducing RF signal. The beta value indicates a degree of asymmetry of the reproducing RF signal.

After the beta value has been detected, the microprocessor 71 obtains a function from the detected beta value and each recording power corresponding to it. The function is then compared with the beta value stored in memory 71 corresponding to the disk code of the optical disk and the OPC recording speed. The optimum recording power at the recording speed (4× recording speed) is then determined based on this comparison and stored into the memory.

After the power ratio at each recording speed for the inserted optical disk and the optimum recording power at 4× recording speed through the OPC procedure are determined, the microprocessor preferably determines the optimum recording power at one or more recording speeds other than 4× recording speed, which is the speed of performing the OPC procedure. In performing this function, the microprocessor multiplies the optimum recording power (for example, 9 mW) at 4× recording speed detected through the OPC by the power ratio stored for other speeds (×6, ×8, ×10, . . . ) respectively so as to detect the optimum recording power at other speeds.

Therefore, in the exemplary case considered above, the optimum recording power at 6× recording speed is determined as follows: 9 mW (optimum recording power at 4× recording speed)×1.5 (power ratio for 6× recording speed)=13.5 mw. The optimum recording power at 8× recording speed is determined as follows: 9 mW (optimum recording power at 4× recording speed)×1.8 (power ratio for 8× recording speed)=16.2 mw. The optimum recording power at the 10× recording speed is determined as follows: 9 mW (optimum recording power at 4× recording speed)×2 (power ratio for 10× recording speed)=18 mw. The microprocessor stores the optimum recording powers at these other recording speeds in memory 71 (S32).

Next, the microprocessor performs a requested recording operation by applying the optimum recording power at one of the recording speeds stored in the memory (S34). The microprocessor can compensate the optimum recording power through an ROPC procedure, which adjusts the strength of a laser beam based on the beta value derived from the reproducing RF signal of the data which is recorded during the recording operation (S35). The microprocessor reads out the recorded data, stopping the recording operation for a certain time at a prescribed time interval or at a given distance or position relative to the inner or outer circumference of the disk during the recording operation. The microprocessor also detects the beta value for the reproducing signal. The recording operation and recording power compensating operation will continue in this manner until all of the requested data is recorded onto the disk (S40).

If the requested recording speed is slower than the prescribed recording speed (e.g., the 4× recording speed in the above embodiment (S30)), the microprocessor performs the OPC procedure for the requested recording speed in the inner circumferential area of the optical disk 10. The optimum recording power is then determined and stored in the memory (S33). The microprocessor also performs the requested recording operation by applying the optimum recording power for the requested recording speed which is stored in the memory.

If the recording power table for the inserted optical disk does not exist in the memory, the microprocessor may use the recording power for each recording speed stored as a default in the memory, or an averaged recording power of each recording speed for other optical disks made by other manufactures.

Meanwhile, if the optical disk is recorded at constant angular velocity (CAV), the recording speed increases linearly as the recording operation proceeds from the inner circumferential area to the outer circumferential area of the disk. In this case, the recording power must be increased commensurately based on an increase in the recording speed.

In the case where the optical disk is rotated at constant linear velocity for each zone (Zone CLV), the recording speed is increased step-by-step in each bounded zone and subsequently the recording power may be increased step-by-step. The optical disk may be considered to rotate at constant linear velocity for each zone when the linear velocity is kept constant within each zone and the linear velocity is allowed to increase in a next zone, provided that the data area from the inner circumference to the outer circumference is divided into the prescribed number of zones.

In the Zone CLV mode, each zone may be divided uniformly and may also be divided arbitrarily. Further, the number of zones may be randomly determined and an increment of the recording speed may be determined uniformly or arbitrarily.

According to one embodiment, in the case where recording is performed while rotating the disk in the Zone CLV mode, the boundary of the zone to which the recording power of next step is applied may be changed by detecting jitter and beta values of the recorded data.

For example, in the case where the disk is widely divided into inner and outer circumferential areas to allow the Zone CLV mode to be applied, the boundary of the inner circumference and the outer circumference is generally an address of 80,000. If jitter and beta values measured during recording the inner circumference are at some acceptable level, it is possible to apply the recording speed and recording power used in the outer circumference from an address of 60,000, which is located closer than the address of 80,000 corresponding to the boundary of the inner and outer circumferential areas.

Meanwhile, if the jitter and beta values measured during recording at the inner circumference are not at acceptable levels, it is possible to apply the recording speed and recording power used in the outer circumference from an address of 100,000, which is located further out than the address of 80,000 corresponding to the boundary between the inner and outer circumferential areas.

In accordance with an alternative embodiment, the reference recording power at each of the recording speeds may be determined by averaging read-out reference powers at each of a plurality of recording speeds according to other optical power tables. The averaged values may then be placed in a table stored in memory and used when, for example, an optical power table was not previously stored in the optical disk device corresponding to the manufacturer (e.g., disk code) of an inserted disk. These other optical power tables may, for example, correspond to ones of other disk manufacturers.

In accordance with another embodiment, an optical disk apparatus comprises ascertaining a reference recording power at each recording speed for an inserted optical disk; performing an OPC procedure for a prescribed recording speed to detect the recording power at the prescribed recording speed if the record is requested; computing a recording power at each recording speed as a basis of the ascertained reference recording power and the detected recording power at the prescribed recording speed.

Preferably, the ascertaining comprises ascertaining a manufacturing company of the inserted optical disk; and reading out a reference recording power at each recording speed of the ascertained manufacturing company, which is stored in the optical disk apparatus.

At this time, the manufacturing company of the optical disk is ascertained through a disk code of the inserted optical disk, and the reference recording power at each recording speed is stored in a memory of the optical disk in a form of table in association with the manufacturing company of the disk.

Further, the ascertaining comprises reading-out a default value of a reference recording power at each recording speed stored in the optical disk apparatus, or reading-out and averaging the reference powers at each recording speed for other manufacturing companies stored in the optical disk apparatus, if the information on the ascertained manufacturing company is not stored in the optical disk apparatus.

Further, the ascertaining further comprises obtaining and storing a power ratio of the reference recording power at other recording speeds on a basis of the prescribed recording speed based on the read-out reference recording power at each recording speed; and the recording power at each recording speed is computed by multiplying the stored power ratio by the detected recording power at the prescribed recording speed. The detecting and the computing are performed if a recording speed faster than the requested prescribed recording speed.

The embodiment further comprises performing recording operation by applying the computed recording power at each recording speed, and may further comprise compensating the recording power on a basis of a reproducing signal for data which is recorded. At this time, the compensating is performed on a basis of an asymmetry degree of a reproducing signal for the recorded data.

Further, the performing the recording operation further comprises changing a boundary of a zone to which a recording power of a next step is applied based on a reproducing signal for recorded data if a Zone CLV mode is used, and whether or not to change the boundary of the zone is determined based on an asymmetry degree and a jitter value of the reproducing signal for the recorded data.

According to one or more embodiments described herein, it is possible to initiate the record operation more rapidly by reducing the length of time which it takes to perform the OPC procedure and prevent an OPC fail in the outer circumference, since the OPC procedure is performed only in the inner circumference even in a case of high-speed recording being requested. Further, it is possible to improve recording quality and reduce the length of recording time by adjusting the recording speed and the recording power in accordance with the recording state.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of controlling an optical disk device, comprising:
   determining a reference recording power for each of a plurality of recording speeds for an optical disk inserted into the optical disk device, wherein the recording speeds include a first recording speed and a second recording speed;
   performing a power control procedure to determine a recording power at the first recording speed in response to a recording request; and
   computing a recording power for the second recording speed by multiplying a power ratio by the recording power determined for the first recording speed, wherein the power ratio is obtained by dividing the reference recording power for the second recording speed by the reference recording power for the first recording speed.

2. The method of claim 1, wherein the reference recording power for each recording speed is determined by:
   identifying a manufacturer of the optical disk;
   obtaining a reference recording power for the recording speed based on the identified manufacturer; and
   storing the reference recording power for the recording speed in the optical disk device.

3. The method of claim 2, wherein the manufacturer of the optical disk is identified based on a disk code read from the optical disk.

4. The method of claim 2, wherein the reference recording power for each of the recording speeds is obtained from a memory in the optical disk device, said memory storing values corresponding to the reference recording power at the recording speeds in association with information identifying the manufacturer of the disk.

5. The method of claim 2, wherein the reference recording power for each of the recording speeds is determined by reading-out a default power value stored for each of the recording speeds, if information on the manufacturer is not stored in the optical disk device.

6. A method of controlling an optical disk device, comprising:
   determining a reference recording power for each of a plurality of recording speeds for an optical disk inserted into the optical disk device, the recording speeds including a first recording speed and a second recording speed;
   performing a power control procedure to determine a recording power for the first recording speed in response to a recording request; and
   computing a recording power for the second recording speed based on the reference recording power and the recording power for the first recording speed, wherein the reference recording power for each recording speed is determined by:
   identifying a manufacturer of the optical disk;
   obtaining a reference recording power for the recording speed based on the identified manufacturer; and
   storing the reference recording power for the recording speed in the optical disk device, and wherein the reference recording power for each recording speed is determined based on averaged reference powers for other manufacturers at the recording speeds, if the information on the manufacturer is not stored in the optical disk device.

7. The method of claim 2, wherein the reference recording power for each of the recording speeds is determined by:
   computing, for each of the recording speeds, a power ratio of reference recording powers based on the reference power for the first recording speed of the recording speeds;
   storing the power ratios in memory; and
   calculating a recording power at each of the recording speeds by multiplying the stored power ratios by the detected recording power corresponding to the first recording speed.

8. The method of claim 1, wherein said performing and computing are performed if a recording speed faster than the prescribed first recording speed is requested.

9. The method of claim 1, further comprising:
   performing a recording operation by applying the computed recording power at the second recording speed.

10. The method of claim 9, wherein performing the recording operation further comprises compensating the computed recording power based on a reproducing signal for data which is being recorded.

11. The method of claim 10, wherein said compensating is performed based on a degree of asymmetry of a reproducing signal for the recorded data.

12. The method of claim 9, wherein performing the recording operation further comprises changing a boundary of a zone to which a recording power of a next step is applied based on a reproducing signal for recorded data if a Zone CLV mode is used.

13. The method of claim 12, wherein changing the boundary of the zone is determined based on a degree of asymmetry or a jitter value of the reproducing signal for the recorded data.

14. An optical disk device recording method, comprising:
   receiving a first power value for each of a plurality of recording speeds based on information read from an optical disk, wherein the plurality of recording speeds include a first recording speed and a second recording speed;
   calculating a power ratio for the first power value; and
   determining a second power value for the second recording speed by multiplying the calculated power ratio by a recording power for the first recording speed, wherein the calculated power ratio is obtained by dividing the first power value for the second recording speed by the first power value for the first recording speed.

15. The method of claim 14, wherein said information read from a disk identifies a manufacturer of the optical disk.

16. The method of claim 15, wherein said information is a disk code corresponding to the manufacturer.

17. The method of claim 14, wherein said determining includes:
   performing an OPC procedure to generate a second power value for the first recording speed; and
   generating second power values for remaining ones of the recording speeds based on corresponding the power ratios calculated for the remaining recording speeds and the second power value generated by the OPC procedure for the first recording speed.

18. The method of claim 17, wherein the OPC procedure is performed in response to a recording request.

19. The method of claim 18, wherein the OPC procedure is performed when the recording request is made for a speed greater than the first recording speed.

20. The method of claim 17, wherein the OPC procedure is only performed for an inner circumferential area of the disk.

21. The method of claim 17, wherein the second power value for each of the remaining recording speeds is computed based on a product of a corresponding power ratio and the second power value generated by the OPC procedure for the first recording speed.

22. The method of claim 17, wherein performing the OPC procedure includes:

retrieving a reference recording power for the first recording speed from memory based on a manufacturer code read from the disk;

generating an adjusting signal based on the reference recording power;

generating test data corresponding to the adjusted signal;

recording the test data onto a predetermined region of the disk;

acquiring a beta value indicating a degree of asymmetry of a reproducing RF signal obtained based on the test data as read out from the disk;

obtaining a function based on the beta value and a recording power corresponding to the beta value;

comparing the function with a stored beta value corresponding to the manufacturer's code; and generating the second power value for the first recording speed based on the comparison.

23. The method of claim 22, wherein the adjusting signal changes recording power in step-by-step increments, each increment corresponding to a same predetermined magnitude.

24. The method of claim 22, wherein the predetermined region of the disk is a test area within a power calibration area (PCA) of the disk.

25. The method of claim 14, wherein, when the second power value is determined based on the power ratio to maintain a constant linear velocity, said method further comprising changing a predetermined recording speed at a predetermined disk address.

26. A method of controlling an optical disk device, comprising:

obtaining reference power values for a plurality of recording speeds, wherein the plurality of recording speeds include a first recording speed and a second recording speed;

calculating a power ratio for the second recording speed by dividing the reference power value corresponding to the second recording speed by the reference power value corresponding to the first recording speed;

determining a power value for the second recording speed by multiplying the calculated power ratio by a recording power value corresponding to the first recording speed determined by performing a power control procedure at the first recording speed; and performing a recording operation for an optical disk inserted into the optical disk device based on the power value determined for the second recording speed, wherein the reference power values for the first and second recording speeds are obtained based on averaged reference powers for at least one manufacturer which is not a manufacturer of said optical disk.

27. An apparatus for controlling an optical disk device, comprising:

a memory to store a reference recording power for each of a plurality of recording speeds for an optical disk inserted into the optical disk device, wherein the plurality of recording speeds include a first recording speed and a second recording speed; and a controller which performs a power control procedure to determine a recording power for the first recording speed in response to a recording request, and which computes a recording power for the second recording speed by multiplying a power ratio by the recording power for the first recording speed, wherein the power ratio is obtained by dividing the reference recording power for the second recording speed by the reference recording power for the first recording speed.

* * * * *